July 8, 1969     J. M. RUBIN     3,453,734
INTERMAXILLARY HOOK
Filed July 20, 1966

INVENTOR.
JAMES M. RUBIN 3,453,734
INTERMAXILLARY HOOK
James M. Rubin, 141 W. 17th St.,
New York, N.Y. 10011
Filed July 20, 1966, Ser. No. 566,665
Int. Cl. A61c *7/00, 3/00*
U.S. Cl. 32—14                              2 Claims

ABSTRACT OF THE DISCLOSURE

An intermaxillary hook formed from a single piece of tubing having a portion of tubing material removed or cut away whereafter the remaining portion may be bent to form a hook for use in orthodontic applications. The hook portion extends substantially parallel to the longitudinal axis of the tubular portion with walls and legs of the hook portion being continuous as respects the tubular portion.

---

This invention relates generally to a novel and improved type of intermaxillary hook and a method of forming same.

Intermaxillary hooks are well known in the art of orthodontics and a detailed description of the use or function thereof is not deemed necessary in order to provide a complete disclosure of the invention herein.

Prior intermaxillary hooks have generally been fabricated of two piece construction wherein a hook portion is secured to a tube portion to provide the finished hook. In the art of orthodontics extremely small, almost microscopic, elements are used and manipulated in the patient's mouth and thus the fabrication of such small elements is often a time consuming and expensive operation. The prior two piece intermaxillary hooks generally have the hook portion soldered, welded or pressed onto the tube portion thereby requiring a multi-step operation greatly increasing the cost of these parts. The soldering, welding or pressing operation can also distort the tube portion and especially the central aperture therethrough often requiring the hook to be scrapped.

Accordingly, it is an object of this invention to provide an intermaxillary hook of one piece construction which can be easily and inexpensively fabricated.

Another object of the invention is to provide a method of forming an intermaxillary hook of improved construction.

Still other objects and advantages of the invention will in part be obvious and will in part be apparent from the specification.

Generally speaking, in accordance with the invention, an improved intermaxillary hook is obtained from a single piece of tubing having a portion of tubing material removed or cut away whereafter the remaining portion may be bent to form a hook having sufficient strength, as a result of the cross sectional configuration, to perform the necessary functions of intermaxillary hooks of this general type.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the invention, reference is had to the following description taken in connection with the accompanying drawing, in which.

Figure 1:
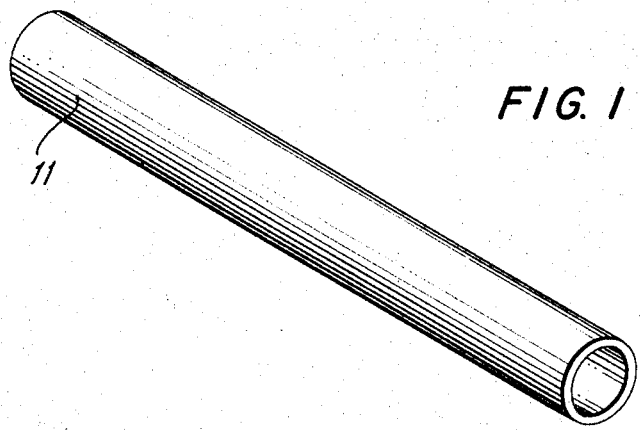
FIG. 1 is a perspective view of a section of tube cut to length which is to be fabricated into an intermaxillary hook of the instant invention.

Referring to FIG. 1, a section of small diameter tubing 11 is cut to length from tube stock with the overall length of the tubing being equal to the developed length of the final intermaxillary hook. By a suitable metal removing method, a portion of tubing 11 is cut away or removed leaving a structure such as that shown in FIG. 2 comprising a tube portion 12 and a tongue portion 13 joined by a smooth arc at an intermediate section 14.

Considering only the tongue portion, approximately 75% of the original tubing is removed so as to leave a base wall 15 with upstanding legs 16. Because of the small size of the articles with which we are here dealing, the tube is preferably cut away by means of grinding, which operation also results in the formation of the arcuate intermediate section 14.

Figure 2:
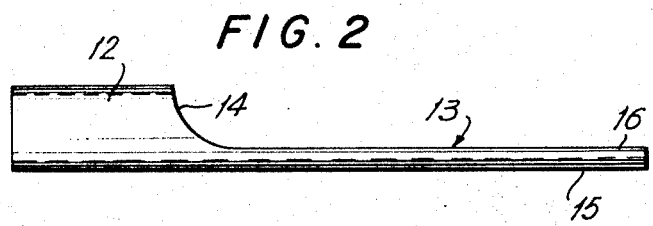
FIG. 2 is a side elevational view of a section of tubing having a portion thereof cut away or removed prior to the bending operation which forms the piece into the intermaxillary hook.
Figure 3:
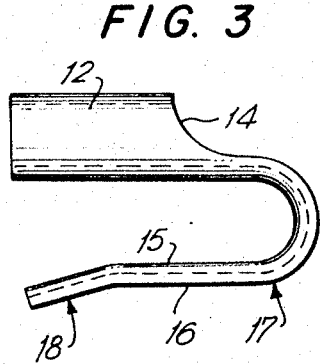
FIG. 3 is a side elevational view of an intermaxillary hook of the instant invention.
Figure 4:
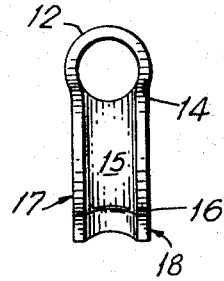
FIG. 4 is an end elevational view thereof.

After the tube has been formed into the element shown in FIG. 2, the tongue portion 13 is thereafter bent to form the hook portion 17 as shown in FIGS. 3 and 4 which may also have an offset end 18.

The intermaxillary hook thus formed, while performing the same function as prior known intermaxillary hooks, is more economical to manufacture since it can be fabricated in substantially less time than the prior two piece constructions. It is stronger since it eliminates the joint required in two piece constructions while embodying a channel shaped construction in the hook portion which is known to have greater structural rigidity.

The added structural rigidity of the channel shaped portion results from the judicious removal of material to form tongue portion 13 whereby upstanding legs 16 merge with and extend from base wall 15. During the forming operation, the channel while slightly flattened, remains sufficiently intact to provide added rigidity to hook portion 17 as a result of the channel shaped configuration.

It will thus be seen that the objects set forth above, among those made apparent from the preceding description, are efficiently attained, and, since certain changes may be made in carrying out the above method and in the article set forth without departing from the spirit and scope of the invention, it is intended that all matter contained in the above description and shown in the accompanying drawing shall be interpreted as illustrative and not in a limiting sense.

What is claimed is:

1. An orthodontic intermaxillary hook of one piece construction comprising a closed tubular portion for receiving an arch wire therethrough and a hook portion for securing one end of a tensioning member, said hook portion including an intermediate portion initially extending from and coextensively with a portion of said tubular portion and having a bend of substantially 180° and an end portion extending substantially parallel to the longitudinal axis of said tubular portion in overlying relationship therewith, said hook portion having a base wall continuous with a portion of the wall of said tubular portion and upstanding legs continuous with other portions of the wall of said tubular portion, said upstanding legs being continuous throughout the length of said hook portion and being curved along a transverse axis.

2. An intermaxillary hook as claimed in claim 1 wherein the outermost portion of said end portion diverges with respect to the longitudinal axis of said tubular portion.

References Cited

UNITED STATES PATENTS

| | | | |
|---|---|---|---|
| 1,044,764 | 11/1912 | Federspiel | 32—14 |
| 1,672,382 | 6/1928 | Harvey | 24—3.3 |
| 1,786,674 | 12/1930 | Perry | 24—38 |

ROBERT PESHOCK, *Primary Examiner.*